United States Patent [19]
Ono et al.

[11] Patent Number: 5,336,875
[45] Date of Patent: Aug. 9, 1994

[54] METHOD AND ARRANGEMENT OF GENERATING A NON-DIFFRACTIVE BEAM AT A LOCATION WHICH IS REMOTE FROM OPTICAL ELEMENT AND APPLICATION THEREOF

[75] Inventors: Yuzo Ono; Kazuhisa Shirakabe, both of Tokyo, Japan

[73] Assignee: NEC Corporation, Tokyo, Japan

[21] Appl. No.: 922,786

[22] Filed: Jul. 31, 1992

[30] Foreign Application Priority Data

Jul. 31, 1991 [JP] Japan .................................. 3-190425
Dec. 19, 1991 [JP] Japan .................................. 3-335399

[51] Int. Cl.5 .......................... G06K 7/10; G02B 5/32; G02B 26/08; G02B 27/30
[52] U.S. Cl. ..................... 235/467; 359/15; 359/196; 359/558; 359/566; 359/641
[58] Field of Search ............... 359/641, 558, 565, 559, 359/28, 11, 900, 15, 19, 205, 206, 207, 210, 216, 217, 218, 219, 221, 196; 235/467, 462

[56] References Cited

U.S. PATENT DOCUMENTS

| | | | |
|---|---|---|---|
| 4,887,885 | 12/1989 | Durnin et al. | 359/559 |
| 4,999,482 | 3/1991 | Yang | 235/467 |
| 5,111,312 | 5/1992 | Stewart | 359/11 |
| 5,245,619 | 9/1993 | Kronberg | 359/559 |

OTHER PUBLICATIONS

J. Durnin, "Exact solutions for nondiffracting beams. I. The scalar theory", J. Opt. Soc. Am. A, vol. 4, No. 4, Apr. 1987, pp. 651–654.
J. Durnin and J. J. Miceli, Jr., "Diffraction-Free Beams", Physical Review Letters, vol. 58, No. 15, Apr. 13, 1987, pp. 1499–1501.
Jari Turunen et al, "Holographic generation of diffraction-free beams", Applied Optics, vol. 27, No. 19, Oct. 1, 1988, pp. 3959–3961.
M. V. Perez et al, "Diffraction patterns and zone plates produced by thin linear axicons", Optica Acta, vol. 33, No. 9, 1986, pp. 1161–1176.

*Primary Examiner*—Loha Ben
*Assistant Examiner*—John Juba, Jr.
*Attorney, Agent, or Firm*—Sughrue, Mion, Zinn, Macpeak & Seas

[57] ABSTRACT

In order to generate a Bessel beam at a location remote from an optical arrangement, the optical arrangement includes, a first beam converging element which is illuminated by a collimated beam, a second beam converging element which is illuminated by a beam which has passed through the first beam converging element. The first and second beam converging elements ere arranged in a manner to radiate a ring beam which is parallel with an optical axis. A third beam converging element is further provided which is illuminated by the ring beam. The third beam converging element is arranged to generate a non-diffractive beam at a location which is remote therefrom. Further, an improvement of a bar code reader is disclosed, which includes a laser source for producing a laser beam. A laser beam deflecting member is provided to deflect the laser beam so as to form a scan pattern comprised of two scan lines. The two scan lines are oriented at a predetermined angle with respect to one another. A combination of photo sensor and electric circuitry is provided to detect the beginning of the scan pattern and to discriminate between the two scan lines.

7 Claims, 6 Drawing Sheets

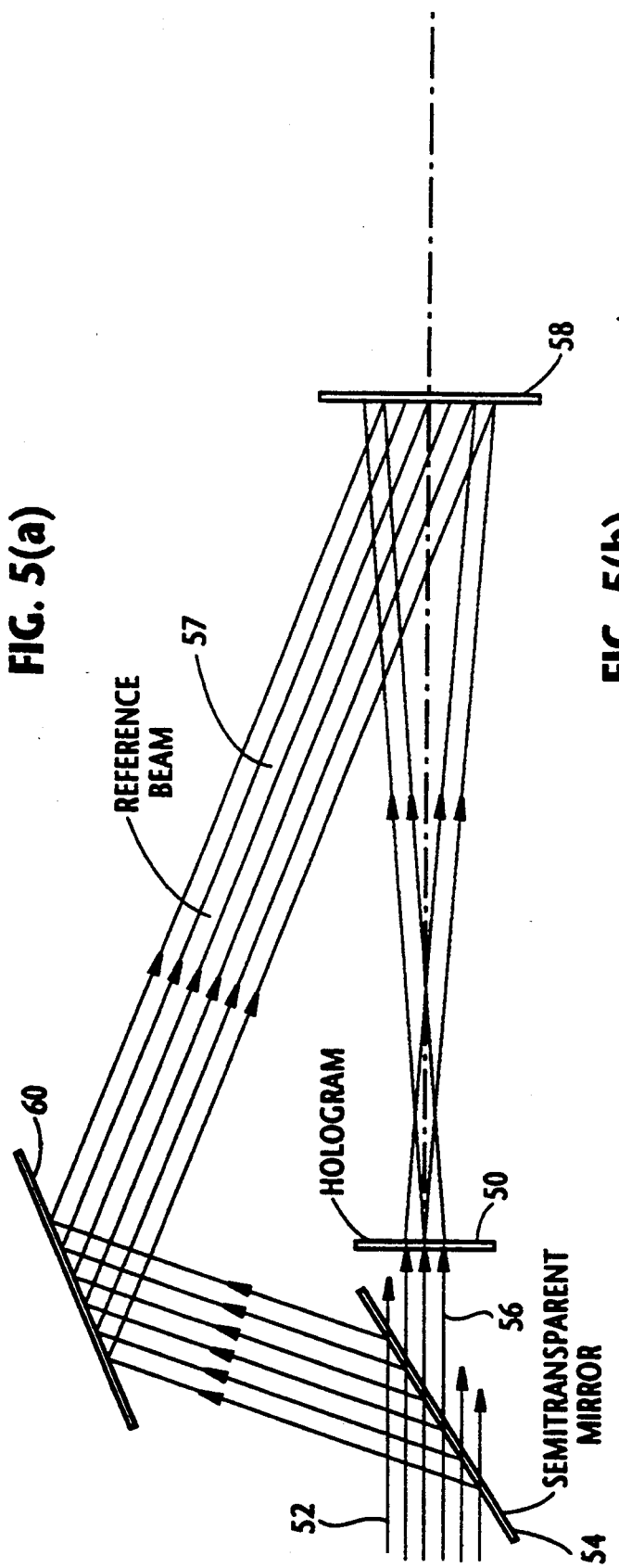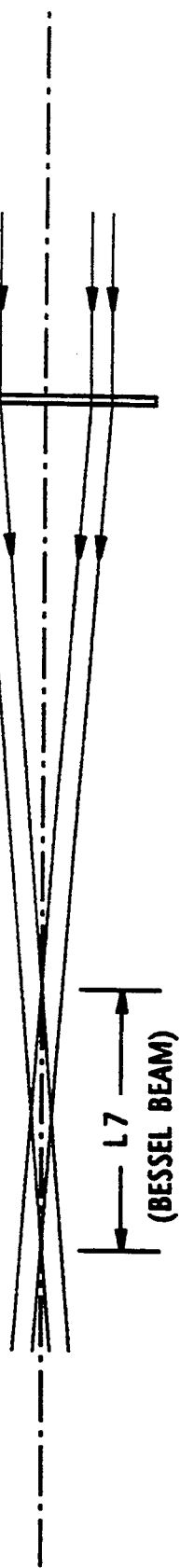

METHOD AND ARRANGEMENT OF GENERATING A NON-DIFFRACTIVE BEAM AT A LOCATION WHICH IS REMOTE FROM OPTICAL ELEMENT AND APPLICATION THEREOF

BACKGROUND OF THE INVENTION

1. Field of the Invention

The present invention relates to a method and arrangement of generating a non-diffractive beam (viz., so-called Bessel beam) at a location which is remote from a Bessel beam producing optical means. Further, the present invention relates to an optical scanner for reading bar coded labels to which the above mentioned method is effectively applicable.

2. Description of the Prior Art

It was recently shown by Durnin that propagation-invariant sharply peaked solutions of the scalar wave equation exists, in an article entitled "Exact solutions for non-diffracting beams. I. The scalar theory", J. Opt. Soc. Am. A, Vol. 4, No. 4, April 1987, pages 651–654 (referred to as prior art paper 1). These solutions, called diffraction-free beams or Bessel beams, contain an infinite energy and accordingly, they are not experimentally realizable.

It has been, however, shown experimentally, also by Durnin, that finite-aperture approximations of these fields exhibit the main propagation features of true diffraction-free beams over a large depth of field, in an article entitled "Diffraction-Free Beams", Volume 58, Apr. 13, 1987, pages 1499–1501 (referred to as prior art paper 2).

On the other hand, Turunen et al have shown a modification of the arrangement in the above mentioned prior art paper 2, in an article entitled "Holographic generation of diffraction-free beams", Applied Optics, Vol. 27, No. 19, Oct. 1, 1988, pages 3959–3962 (referred to as prior art paper 3).

Further, Perez et al have disclosed generation of the Bessel beam employing an axicon in an article entitled "Diffraction patterns and zone plates produced by thin linear axicons", Optica Acta, 1986, Vol. 33,No. 9, pages 1161–1176 (referred to as prior art paper 4).

Before turning to the present invention it is deemed advantageous to briefly discuss the above mentioned prior art techniques with reference to FIGS. 1(a)–1(c) and 2(a)–2(c).

FIG. 1(a) shows an optics arrangement for generating a finite-aperture approximation of a Bessel beam, which wee shown in the above mentioned prior art papers 1 and 2, In FIG. 1(e), a coherent plane wave depicted by reference numeral 10 illuminates a thin annular slit 12, which is placed in the focal plane of a positive lens 14 ("F" denotes a focal length of the lens 14). The wavefront after the lens 14 is seen to be conical (i.e., the wave vectors are uniformly distributed on a cone). The prior art paper 1 shows that the arrangement shown in FIG. 1 exhibits a Bessel beam over a distance depicted by L1. A character "L" with a numeral is also used to depict a Bessel beam in addition to a distance.

FIGS. 2(a)–2(c) show the beam intensity profiles at z=25, 77 and 100 cm (z denotes an optical axis), respectively, with the intensity of the Gaussian profiles (depicted by broken lines) multiplied by a factor 10. It is understood that the Bessel beam has a remarkably greater depth of field than the Gaussian beam.

Turunen et al., disclosed, in the prior art paper 3, an arrangement shown In FIG. 1(b) using a holographic optical element (viz., a cylindrically symmetric hologram) 16. The FIG. 1(b) arrangement exhibits a Bessel beam L2 whose distance is twice L1 in FIG. 1(a). According to Turunen et al, the hologram 16 converts an incident plane wave 18 into a conical wave, which (according to geometrical optics) after the plane, at which the lens 14 is located, is similar to the wavefront in FIG. 1(a). Turunen et al., have shown that the diffraction-free propagation ranges a geometrical optics prediction of $$L2 = D\rho/\lambda \qquad (1)$$

where D is a radius of the hologram 16, $\rho$ a pitch of the slit of the hologram 16, and $\lambda$ a wave length of the incoming coherent plane wave.

Further, Turunen et al., have described the full width of the bright central lobe (viz., diameter of a Bessel beam) W is represented by $$W = 0.766\rho \qquad (2)$$

FIG. 1(c) shows another arrangement using an axicon 20 for generating a Bessel beam having a length L3, which has been shown in the above mentioned prior art paper 3.

For further details regarding the arrangements of FIGS. 1(a)–1(c), reference should be made to prior art papers 1–3 respectively.

As shown in FIG. 1(a), the Bessel beam exists over a distance L1 starting immediately after the lens 14. This applies to the he other arrangements shown in FIGS. 1(b) and 1(c). Accordingly, if each of these arrangements is applied to an optical device wherein a beam radius should be very small, each of the above mentioned prior art techniques may encounter the problem that there is insufficient room or space for accommodating an optical member(s) within the range within which the Bessel beam can be generated. In more specific terms, if the diameter of the Bessel beam (W) is 0.2 mm, then the pitch of the hologram slit ($\rho$) is about 0.26 mm as will be appreciated from equation (2). Further, if the radius of the hologram 16 is 5 mm, then the Bessel beam length L2 becomes approximately 2 m.

Therefore as will be appreciated, if a beam having a very small radius (viz., a Bessel beam) is required to impinge an object beyond the Bessel beam, each of the above mentioned prior techniques is no longer utilized.

SUMMARY OF THE INVENTION

It is an object of the present invention to provide a method of effectively controlling the position at which a Bessel beam is formed along an optical axis of an optical device wherein a very small beam radius is required.

Another object of the present invention is to provide an arrangement of effectively controlling the position at which a Bessel beam is produced along an optical axis of an optical device wherein a very small beam radius is required.

Still another object of the present invention is to provide an improvement in an optical scanner using a position controllable Bessel beam.

A first aspect of the present invention comes in a method of generating a non-diffractive beam which is remote from an optical arrangement, comprising: (a) illuminating a first beam converging element using a collimated beam; (b) illuminating a second beam converging element using a beam which has passed through said first beam converging element, said first and second beam converging elements being arranged in a manner to issue a ring beam which is parallel with an optical axis; and (c) illuminating a third beam converging element using said ring beam, said third beam converging element generating a non-diffractive beam at a location which is remote from said third beam converging element.

Another aspect of the present invention comes in an optical arrangement for generating a non-diffractive beam, comprising: a first beam converging element which is illuminated by a collimated beam; a second beam converging element which is illuminated by a beam which has passed through said first beam converging element, said first and second beam converging elements being arranged in a manner to issue a ring beam which is parallel with an optical axis; and a third beam converging element which is illuminated by said ring beam, said third beam converging element generating a non-diffractive beam at a location which is remote from said third beam converging element.

Still another aspect of the present invention comes in a bar code reader which comprises: means for producing a laser beam; means for deflecting said loser beam so as to form a scan pattern comprised of first and second scan lines, said first and second scan lines being oriented at a predetermined angle with respect to one another; and means for detecting the beginning of the scan pattern and for discriminating between said first and second scan lines.

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIGS. 5(a) and 5(b) are diagrams which show arrangements according to e second embodiment of the present invention.

DETAILED DESCRIPTION OF THE PREFERRED EMBODIMENTS

A principle underlying the first embodiment of the present invention will be discussed with reference to FIGS. 3(a) and 3(b).

Figure 3A:
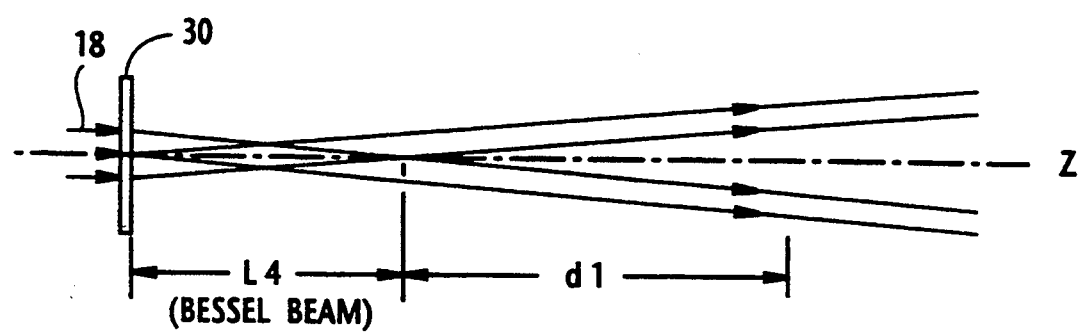
FIGS. 3(a) and 3(b) are diagrams which show the concept on which the invention is based.

FIG. 3(a) shows an optical arrangement, using a hologram 30, for the generation of a Bessel beam L4 and a diffracted beam whose transverse profile takes the form of a ring-like shape and which is induced after the Bessel beam L4. The arrangement of FIG. 3(a) is essentially identical with that of FIG. 1(b).

AS in the case described in the opening paragraphs of the instant disclosure, the arrangement of FIG. 3(a) generates the Bessel beam L4 which begins immediately after the hologram 30.

Figure 3B:
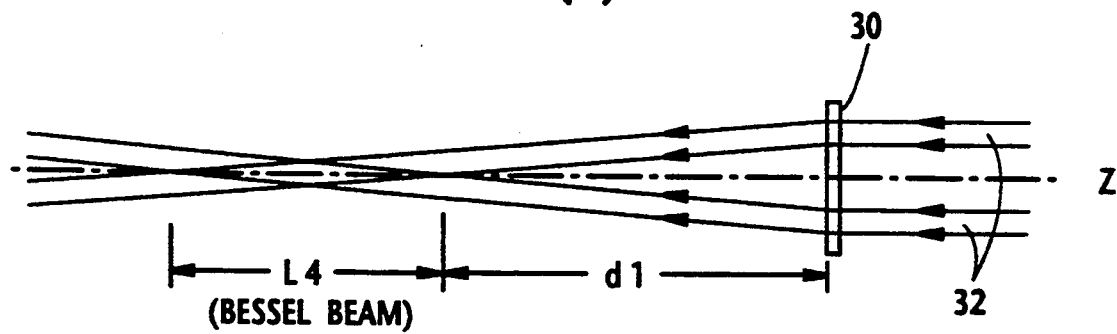

However, as will be appreciated, if the hologram 30 is provided at a location away from the Bessel beam by a distance d1 as indicated in FIGS. 3(a) and 3(b) and if the hologram 30 is illuminated from the right (as seen in FIG. 3(b)) by a ring-like beam 32 which is parallel with the optical axis z, then a Bessel beam L4 can be generated at the distance d1 away from the hologram 30.

This therefore renders it possible for a Bessel beam to be generated at e location which is remote from the hologram per se.

Figure 1A:
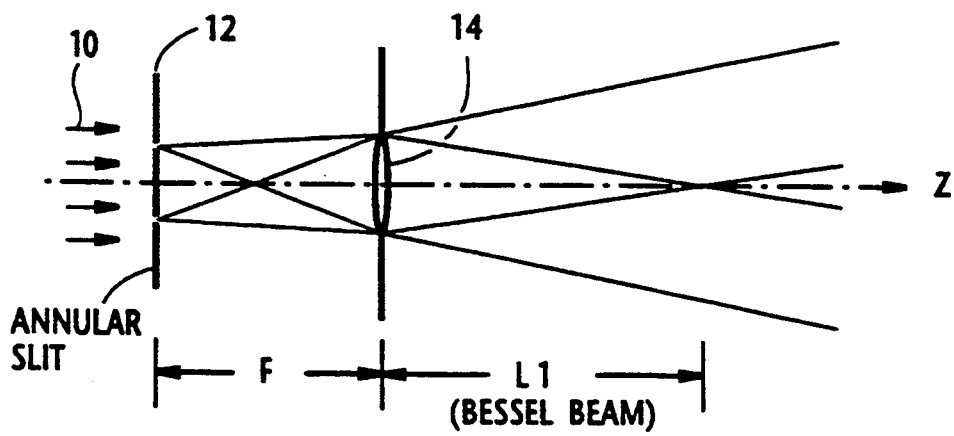
Figs. 1(a)-1(c) are optical diagrams which schematically depict the prior art techniques discussed in the opening paragraphs of the instant disclosure.
Figure 1B:
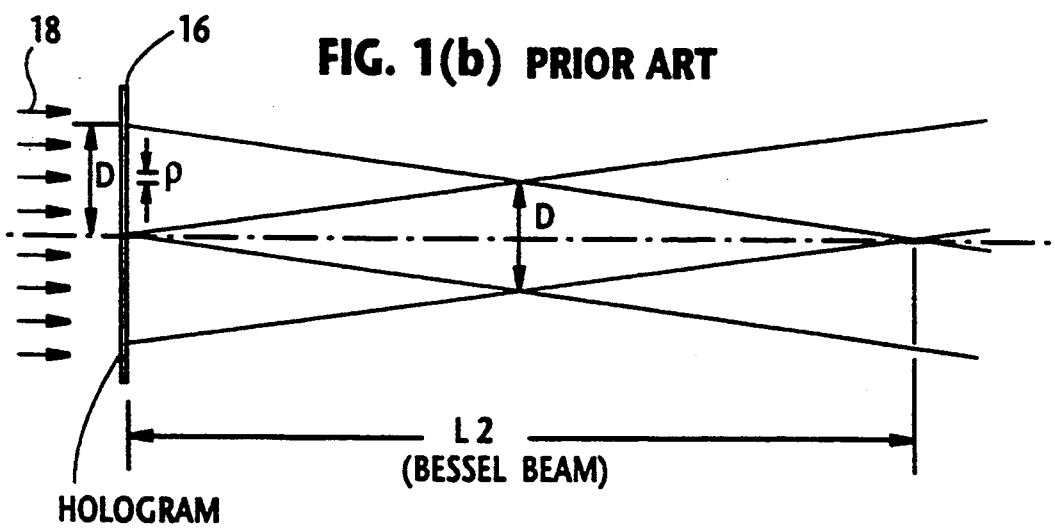
Figure 1C:
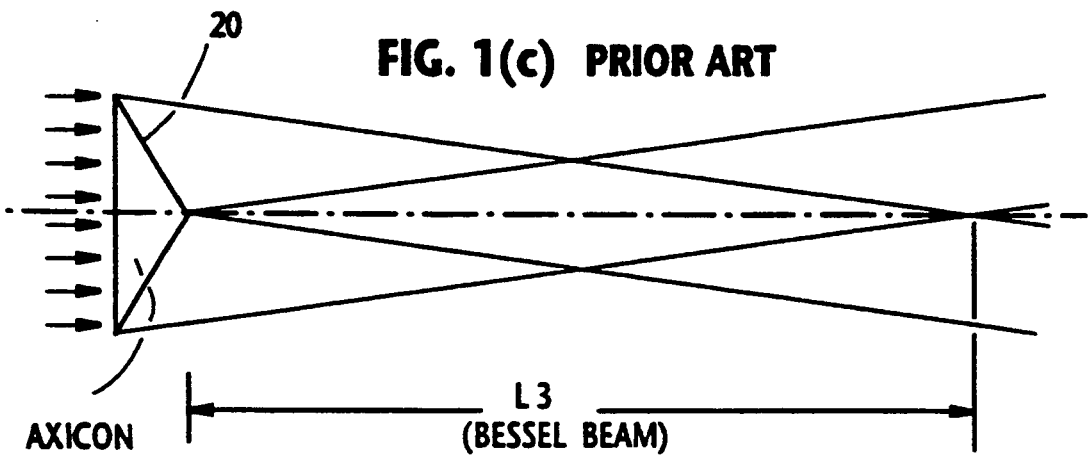
Figure 2A:
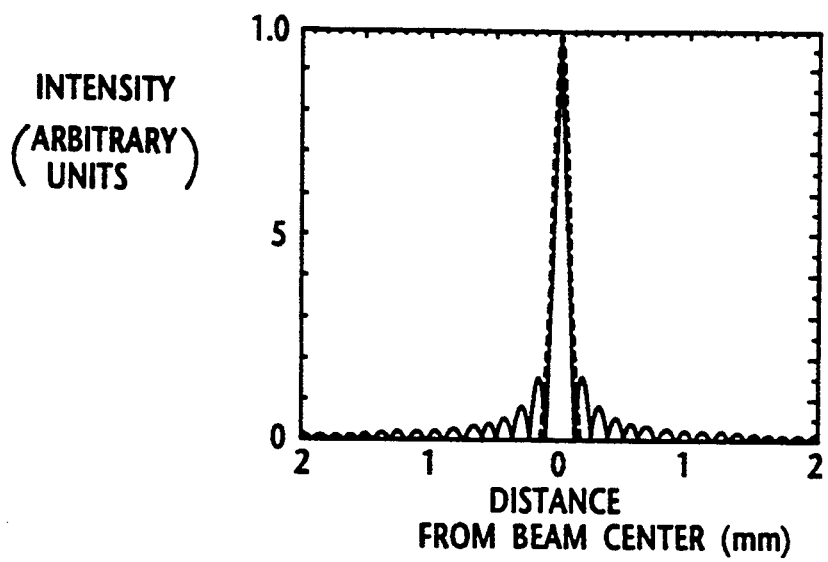
FIGS. 2(a)-2(c) show beam intensity profiles at z=25, 77 and 100 cm, respectively, with the intensity of the Gaussian profiles (depicted by broken lines) multiplied by a factor of 10.
Figure 2B:
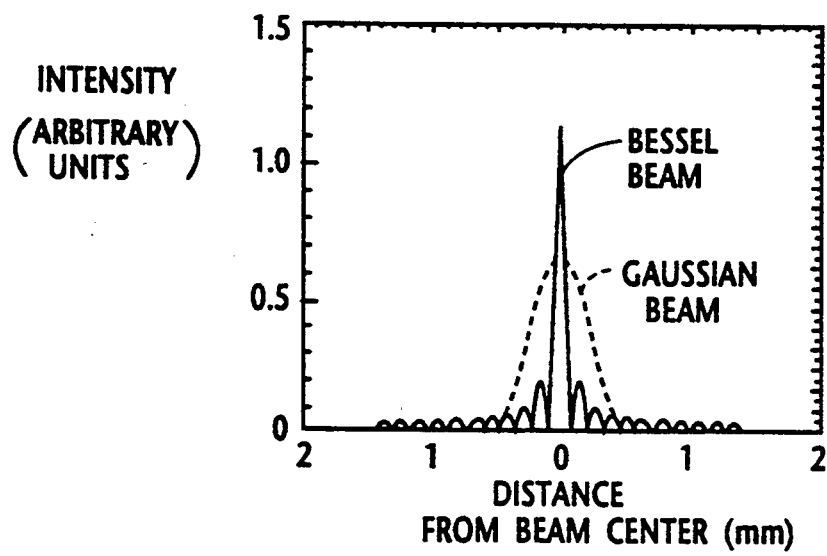
Figure 2C:
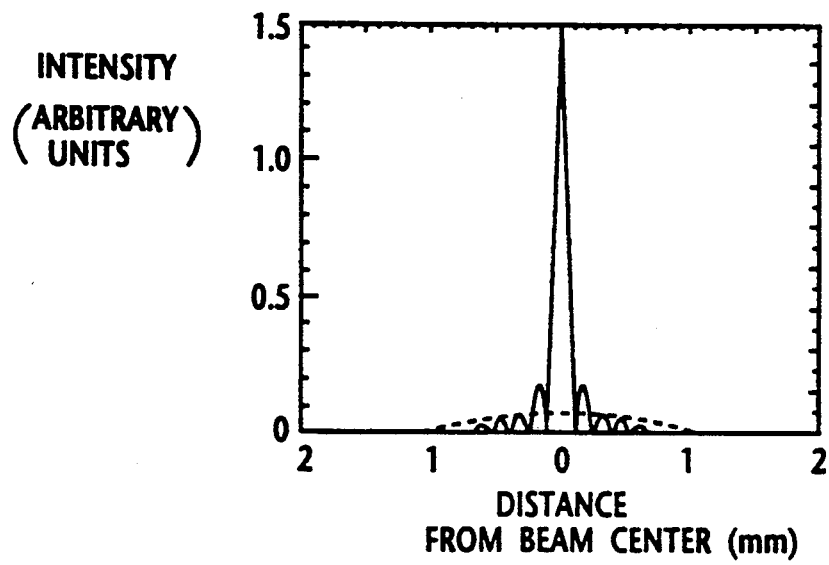

The above discussion is of course also applicable to the other cases of FIGS. 1(a) and 1(c) which utilize annular slit 12 and axicon 20, respectively.

The first embodiment of the present invention, utilizing the above mentioned principle, will be discussed with reference to FIGS. 4(a) and 4(b).

Figure 4A:
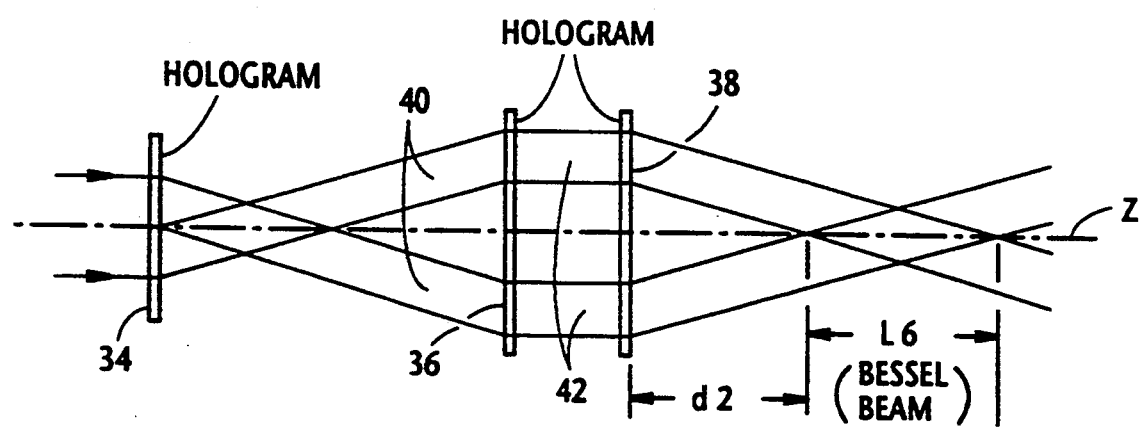
FIGS. 4(a) and 4(b) are diagrams which show arrangements according a first embodiment of the invention.

As shown, the optical arrangement of FIG. 4(a) includes first to third holograms 34, 36 and 38 provided along an optical axis z. The holograms 34 and 38 correspond to the holograms 16 (FIG. 1(b)) and 30 (FIG. 3(b)) respectively. The second hologram 36 is provided to convert a diverging ring beam 40 into a ring beam 42 parallel with the optical axis z. The hologram 38, which is illuminated by the ring beam 42 from the left, generates a Bessel beam L6 at a location which is remote therefrom by a distance d2.

Figure 4B:
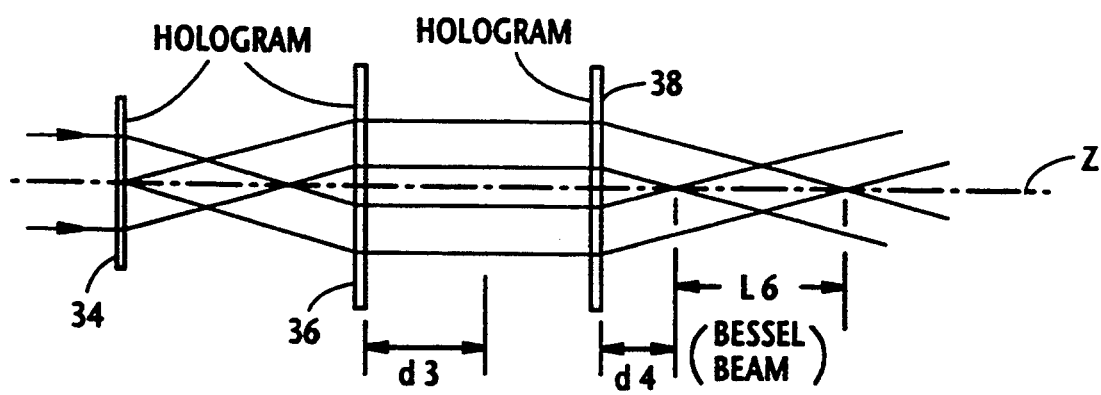

FIG. 4(b) shows the optical arrangement wherein the hologram 36 (FIG. 4(a)) is displaced to the left (as seen in the drawings) by an additional distance d3. As will be noted, the Bessel beam L6 is shifted to the left and separated from the hologram 38 by a distance d4 which is smaller than distance d2. In this instance, the other hologram 38 can be displaced alone or together with the hologram 36.

In the above mentioned principle of the first embodiment (see FIG. 3(b)), if the Bessel beam L4 is positioned too remote from the hologram 30, a problem is induced that the ring beam between the hologram 30 and the Bessel beam L4 is liable to diffract to an appreciable extent and, eventually deteriorates the Bessel beam L4. The second embodiment of the present invention is to overcome this difficulty.

FIG. 5(a) illustrates an optical arrangement according to a second embodiment of the invention.

In FIG. 5(a), hologram 50 corresponds to the hologram 30 of FIG. 3(a). A coherence beam 52 is divided, by a semitransparent mirror 54, so that some of the beam (depicted by numeral 56) passes through the hologram 50 and is then directed to a photographic plate 58, while on the other hand, the other part of the beam 52 (viz., reference beam 57) illuminates the photographic plate 58 after being reflected by a mirror 60. The two beams 56, 57 form interference patterns on the plate 58, which when developed is used as a hologram 58' as shown in FIG. 5(b). More specifically, after the hologram 58' is developed and is illuminated by the original reference beam as shown in FIG. 5(b), a diffraction-free Bessel beam L7 can be obtained at a location which is relatively remote from the hologram 58'.

Figure 6A:
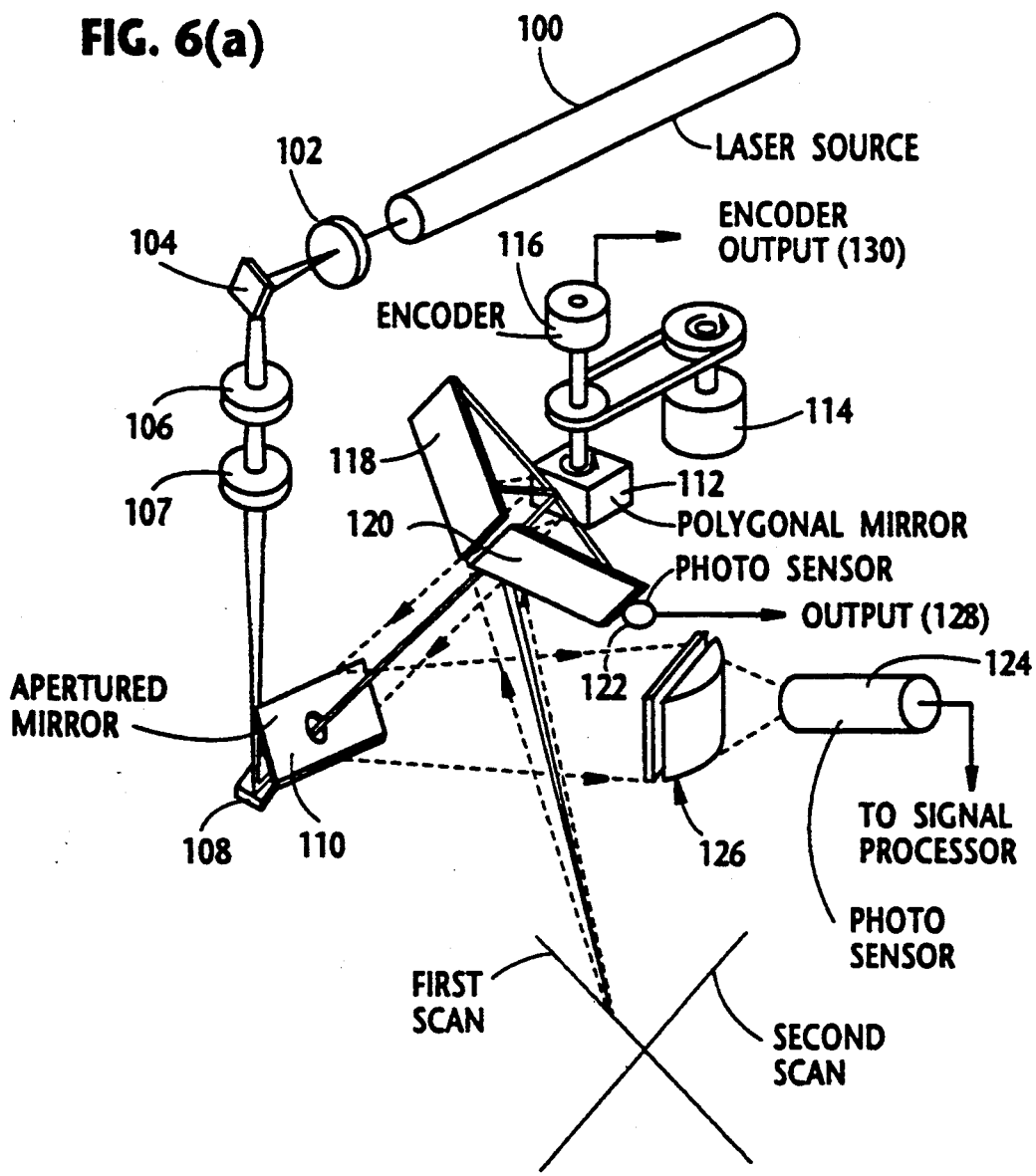
FIGS. 6(a)-6(c) are views showing arrangements which characterize a third embodiment of the present invention.
Figure 6B:
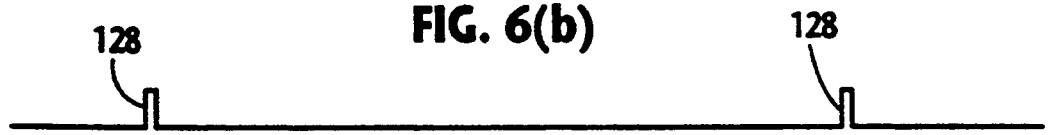
Figure 6C:
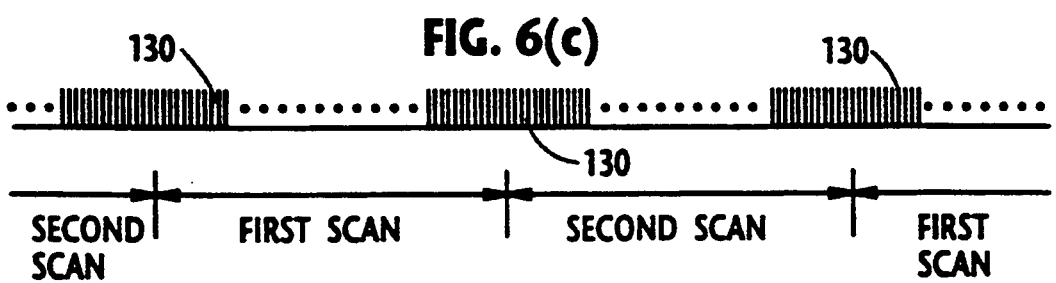

FIGS. 6(a) to 6(c) show a third embodiment of the present invention. This embodiment features the arrangement wherein s laser beam which is generated by a laser source 100, is passed through a first converging element 102, reflected off a first mirror 104, passed through a second converging element 106 and reflected off a second mirror 108 to provide a Bessel beam in the scan field.

The beam which is reflected off the second mirror 108 is directed through an apertured mirror 110 to a rotatable polygonal mirror 112. This rotatable polygonal mirror 112 is operatively connected with a motor 114 and an encoder 116 in the manner illustrated in FIG. 6(a). Scanning or beam directing mirrors 118, 120 are arranged with respect to the rotatable polygonal mirror 112 so as to enable an X (for example) type scanning pattern to be formed. A first photo sensor 122 is arranged at the edge of the one of the two scanning mirrors 120 and arranged to detect the laser beam impinging thereon. The significance of this detection will become apparent hereinafter.

A second photo sensor 124 is arranged with respect to the apertured mirror 110 so that reflections which are reflected off the scanning mirrors 118, 120 impinge onto the apertured mirror 110, are received after having passed through a lens system generally denoted by numeral 126.

The operation of this device is such that the output of the first photo sensor 122 can be used to determine the beginning or end of one complete x scan. That is to say, as shown in the timing chart of FIGS. 6(b) and 6(c), by using the output 128 of the first photo sensor 122 (FIG. 6(a)) it is possible to start counting of the output of the encoder 116 and, upon a given number being reached, assume that the first of the two scans which comprise the X scan pattern, has been completed and that the second of the two is initiated. For the sake of explanation, the first of the two scans will be referred to as a first scan while the second of the two will be referred to as a second scan simply for the ease of reference. The first and second scan can be arranged to intersect at any suitable angle.

With the ability to distinguish between the first and second scans, it is possible to apply the device to arrangements of the nature wherein closely arranged two bar coded labels (viz., label-carrying items or products) are carried on a conveyor belt (for example). As the label-carrying items move along, one bar coded label is scanned by the first scan (for example) while the next is scanned by the second scan, the third bar coded label scanned by the first scan and so on.

Using this technique it is possible to differentiate between two different label-carrying items which are arranged immediately side by side. Hithertofore, it has been necessary to ensure that a suitable spacing has been provided between items which are to undergo a conventional type of bar code scanning. However, with the instant embodiment, it is possible to eliminate this spacing and therefore vastly improve the efficiency with which the procedure can be carried out.

In order to allow for items wherein the bar codes are located at different distances from the scanning mechanism, the concept whereby the Bessel beam can be induced to occur at a location remote from the scanning mechanism can be advantageously applied to this type of situation to increase the depth of field and ensure accurate bar code readings. In accordance with this objective, a third converging element 107 is provided along the beam axis.

In the above discussion of the third embodiment, the number of scans is only two. However, it is within the scope of the third embodiment to increase the number of scans which exceeds two in order to Increase the chances that a randomly oriented label will be properly scanned.

It will be understood that the above disclosure is representative of only a few of the possible embodiments of the present invention and that the concept on which the invention is based is not specifically limited thereto.

What is claimed is:

1. A bar code reader, comprising:
   means for producing a laser beam;
   a first beam converging element which is illuminated by said laser beam;
   a second beam converging element which is illuminated by a beam which has passed through said first beam converging element, said first and second beam converging elements being arranged in a manner to issue a ring beam which is parallel with an optical axis;
   a third beam converging element which is illuminated by said ring beam, said third beam converging element generating a diffraction-free Bessel beam at a location which is remote from said third beam converging element;
   means for deflecting said diffraction-free Bessel beam so as to form a scan pattern comprised of first and second scan lines, said first and second scan lines being oriented at a predetermined angle with respect to one another; and
   means for detecting the beginning of the scan pattern and for discriminating between said first and second scan lines.

2. A bar code reader as claimed in claim 1, wherein at least one of said second and third beam converging elements is displaceable along said optical axis.

3. A bar code reader as claimed in claim 1, wherein each of said first and second beam converging elements is a hologram.

4. A bar code reader as claimed in claim 1, wherein each of said first and third beam converging elements is an axicon.

5. A bar code reader, comprising:
   means for producing a laser beam;
   a first beam converging element which is illuminated by said laser beam;
   a second beam converging element which is illuminated by a beam which has passed through said first beam converging element, said first and second beam converging elements being arranged in a manner to issue a ring beam which is parallel with an optical axis, said second beam converging element being displaceable along said optical axis;
   a third beam converging element which is illuminated by said ring beam, said third beam converging element generating a diffraction-free Bessel beam at a location which is remote from said third beam converging element, said third beam converging element being displaceable along said optical axis;
   means for deflecting said non-diffraction-free Bessel beam so as to form a scan pattern comprised of first and second scan lines, said first and second scan lines being oriented at a predetermined angle with respect to one another; and
   means for detecting the beginning of the scan pattern and for discriminating between said first and second scan lines.

6. A bar code reader as claimed in claim 5, wherein each of said first and second beam converging elements is a hologram.

7. A bar code reader as claimed in claim 5, where each of said first and third beam converging elements is an axicon.

* * * * *

UNITED STATES PATENT AND TRADEMARK OFFICE
CERTIFICATE OF CORRECTION

PATENT NO. : 5,336,875
DATED : August 9, 1994
INVENTOR(S) : Yuzo ONO et al.

It is certified that error(s) appears in the above-identified patent and that said Letters Patent is hereby corrected as shown below:

Title Page:

In the Abstract, line 7, delete "ere" and insert --are--.

Column 1, line 48, delete "optics" and insert --optical--.

Column 2, line 32, delete "he".

Column 3, line 25, delete "loser" and insert --laser--;

line 52, delete "e" and insert --the--.

Column 4, line 1, delete "AS" and insert --As--;

line 13, delete "e" and insert --the--;

line 66, delete "s" and insert --a--.

UNITED STATES PATENT AND TRADEMARK OFFICE
CERTIFICATE OF CORRECTION

PATENT NO. : 5,336,875
DATED : August 9, 1994
INVENTOR(S) : Yuzo ONO et al.

It is certified that error appears in the above-indentified patent and that said Letters Patent is hereby corrected as shown below:

Column 5, line 24, delete "x" and insert --X--.

Signed and Sealed this

Twenty-second Day of November, 1994

Attest:

BRUCE LEHMAN

Attesting Officer

Commissioner of Patents and Trademarks